US008237702B2

(12) United States Patent
Chang

(10) Patent No.: US 8,237,702 B2
(45) Date of Patent: Aug. 7, 2012

(54) RADIO FREQUENCY IDENTIFICATION (RFID) SYSTEMS AND METHODS

(75) Inventor: Hwa-Hsiang Chang, Taipei County (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 1199 days.

(21) Appl. No.: 11/594,128

(22) Filed: Nov. 8, 2006

(65) Prior Publication Data

US 2007/0241902 A1 Oct. 18, 2007

(30) Foreign Application Priority Data

Apr. 18, 2006 (TW) .............................. 95113751 A

(51) Int. Cl.
*G06F 17/00* (2006.01)

(52) U.S. Cl. .................................... 345/418; 340/13.26

(58) Field of Classification Search .................. 345/418; 340/13.26

See application file for complete search history.

(56) References Cited

U.S. PATENT DOCUMENTS

| | | | | |
|---|---|---|---|---|
| 6,002,344 | A * | 12/1999 | Bandy et al. | 340/10.2 |
| 7,002,473 | B2 * | 2/2006 | Glick et al. | 340/572.1 |
| 2003/0005316 | A1 * | 1/2003 | Girard | 713/193 |
| 2005/0246094 | A1 * | 11/2005 | Moscatiello | 701/207 |
| 2005/0253687 | A1 * | 11/2005 | Martinez et al. | 340/10.2 |
| 2006/0224306 | A1 * | 10/2006 | Workman et al. | 701/207 |
| 2006/0267762 | A1 * | 11/2006 | Jedlicka et al. | 340/539.23 |
| 2007/0063895 | A1 * | 3/2007 | August et al. | 342/359 |

* cited by examiner

*Primary Examiner* — Maurice L McDowell, Jr.

(74) *Attorney, Agent, or Firm* — Muncy, Geissler, Olds & Lowe, PLLC

(57) ABSTRACT

A radio frequency identification (RFID) system comprises a reader, a memory, and a processor. When initiated, the reader receives an identification code of a first tag within a wireless communication range. The memory stores a time setting and an identification code of a second tag. The processor initiates the reader at a predetermined time indicated by the time setting, thus to determine whether the second tag exists in the wireless communication range.

22 Claims, 5 Drawing Sheets

RADIO FREQUENCY IDENTIFICATION (RFID) SYSTEMS AND METHODS

BACKGROUND OF THE INVENTION

1. Field of the Invention

The present invention relates to computer communication techniques and more particularly to radio frequency identification (RFID) systems.

2. Description of the Related Art

As portable devices have developed, they have become smaller, and lighter, and cards are increasingly used for trade. Thus men carry more electronics, cards, and other personal portable items. One may not notice when one item is lost until it is needed again. Additionally, different items are necessary on different occasions. Regularly checking for items is troublesome.

Although memo or similar functions provided by current personal digital assistants (PDAs) or mobile phones can be utilized to store names of items, the items must be manually entered and passively checked to determine whether any of the articles is lost or missed, no corresponding alert can be provided when an item is lost or goes missing. Current aid provided by PDAs and mobile phones to assist in personal item management is restricted.

BRIEF SUMMARY OF THE INVENTION

An exemplary embodiment of a radio frequency identification (RFID) system comprises a reader, a memory, and a processor. When initiated, the reader receives an identification code of a first tag within a wireless communication range. The memory stores a time setting and an identification code of a second tag. The processor initiates the reader at a predetermined time indicated by the time setting to, thus determine whether the second tag exists in the wireless communication range.

An exemplary embodiment of a radio frequency identification (RFID) system comprises a reader, a memory, an inertial motion sensor, and a processor. When initiated, the reader receives an identification code of a first tag within a wireless communication range. The memory stores an identification code of a second tag. The inertial motion sensor detects motion of the RFID system. The processor initiates the reader based on the motion detection by the inertial motion sensor to determine whether the second tag exists in the wireless communication range.

An exemplary embodiment of a radio frequency identification (RFID) method is implemented in an RFID system. A time setting and an identification code of a first tag are stored in the RFID system. A reader of the RFID system is initiated at a predetermined time indicated by the time setting. An identification code of a second tag within a wireless communication range of the reader is received. The identification codes of the first and the second tags are compared to determine whether the first tag exists in the wireless communication range.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Radio frequency identification (RFID) systems and methods are provided. Because of their convenience, RFID systems have been widely used in object management for access control of human or object in hospitals, factory, and libraries for example. A conventional RFID system comprises a host computer coupled to a plurality of RFID readers through cables. RFID readers, which may be located in different places in a building, can respectively read identification information of RFID tags. The host computer performs complex computations for management processes.

Conventional RFID systems are immovably fixed to stable bases and, thus, are not suitable for personal use, hence, systems and methods suitable for personal user are desirable.

Figure 1:
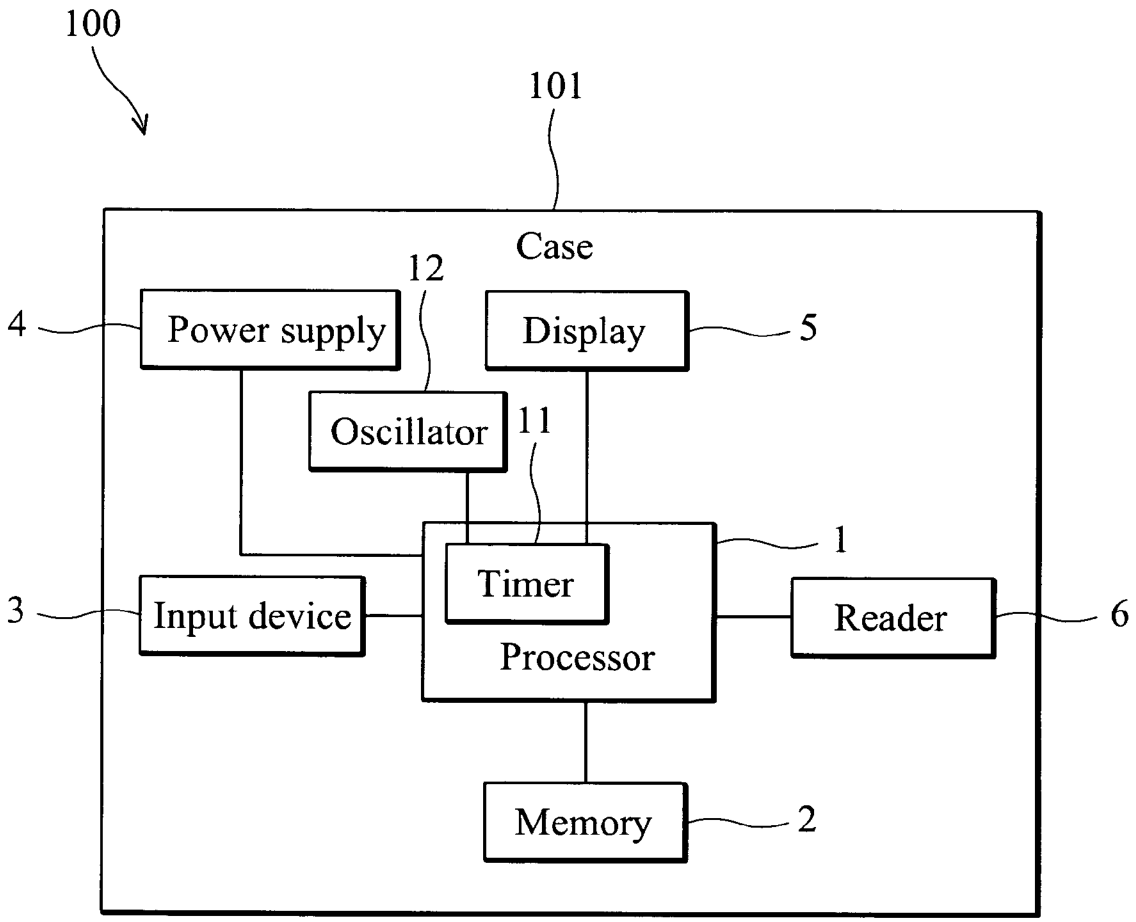
FIG. 1 is a block diagram of an exemplary embodiment of a radio frequency identification (RFID) system.

With reference to FIG. 1, RFID system 100 comprises case 101, processor 1, memory 2, input device 3, power supply 4, display 5, and reader 6. Power supply 4 supplies power to each electrical component of RFID system 100, wherein power supply 4, reader 6, memory 2, and processor 1 are disposed in a case to form a portable device. Power supply 4 may be implemented by rechargeable batteries, a solar panel or a power generator. Processor 1 and memory 2 may be integrated and packed in a single chip. Memory 2 may comprise non-volatile memory, such as flash memory, or a combination of storage devices (such as a hard disk) and a random-access memory (RAM). These components are disposed in a case to form a portable device. For example, RFID system 100 may be integrated into a PDA or a mobile phone.

Input device 3 may comprise a button, a touch panel, or others which when operated, initiates the reader 6. When initiated, reader 6 receives an identification (ID) code of all tags within a wireless communication range and transmits the ID codes to processor 1. Memory may store a time setting and ID codes of a plurality of tags. The time setting may indicate a specific time, a period or a cycle of time. Processor 1 may comprise a timer 11 coupled to oscillator 12. Timer 11 may comprise a clock. According to the time setting, processor 1 may periodically initiate reader 6 once for each cycle to determine whether the tags exist in the wireless communication range, or initiate reader 6 at the specific time.

Figure 2:
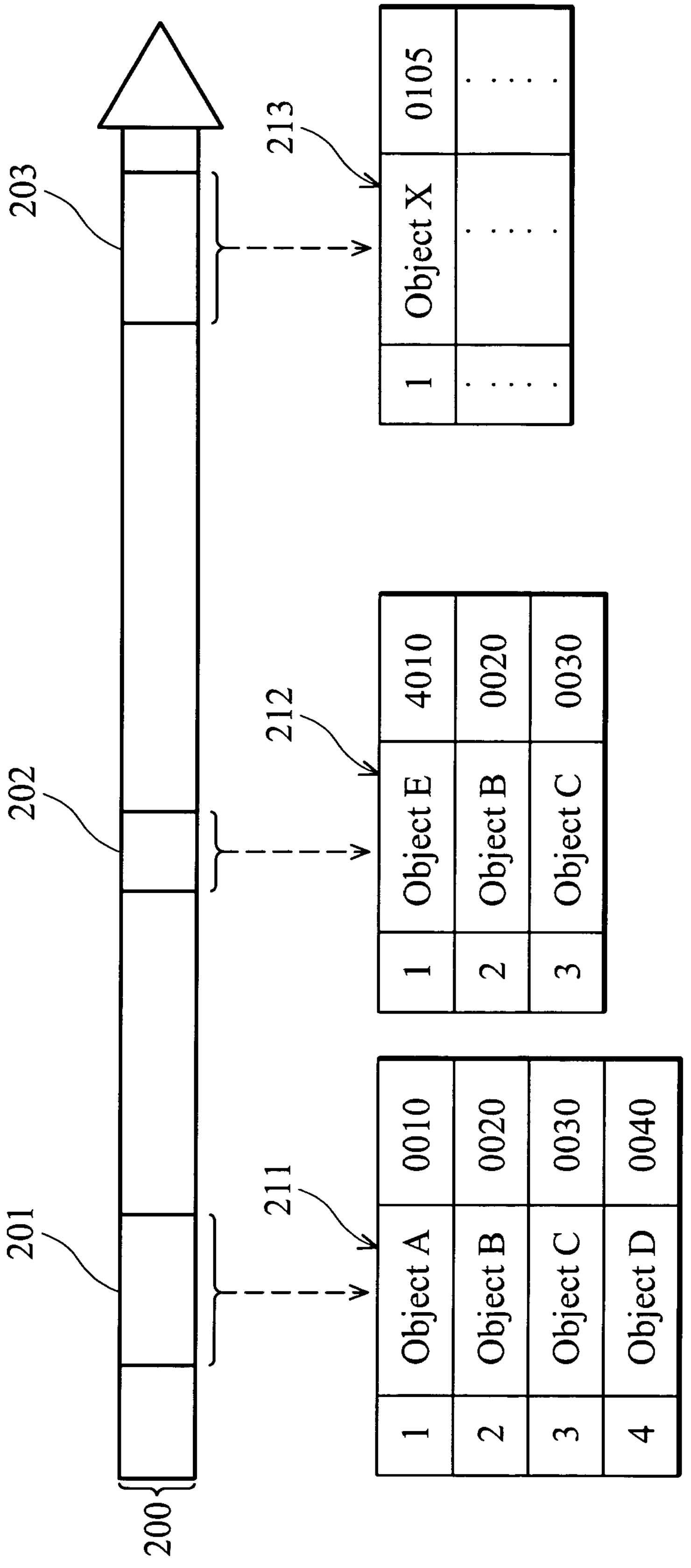
FIG. 2 is a schematic view showing the relationship between time settings and a plurality of tag ID codes.

FIG. 2 is a schematic view showing the relationship between time settings and a plurality of tag ID codes. Memory 2 stores schedule 200 and tables 211-213. Schedule 200 comprises sessions 201-203 planned for different activities. Each session corresponds to a table of objects. Sessions 201-203 respectively correspond to tables 211-213. The beginning, ending, and duration of each session may be configured and modified through input device 3. Table 211 comprises a priority number, name, and tag. ID for each of objects A, B, C, and D. The priority numbers may indicate the order of object detection. The name, and tag ID of each object can be stored in a tag attached to the object, read by reader 6, entered to RFID system 100, and stored in memory 2.

Input device 3 and user interfaces provided by RFID system 100 may also be utilized to enter contents into the tables. Tags readable by RFID system 100 may be attached to a wallet, a mobile phone, a credit card, clothing, baggage, and similar. A tag transmits tag ID in response to a trigger signal from reader 6. For example, the wireless communication range of reader 6 is defined as to range one meter away from reader 6. Reader 6 is initially shut off to prevent power consumption.

Figure 3:
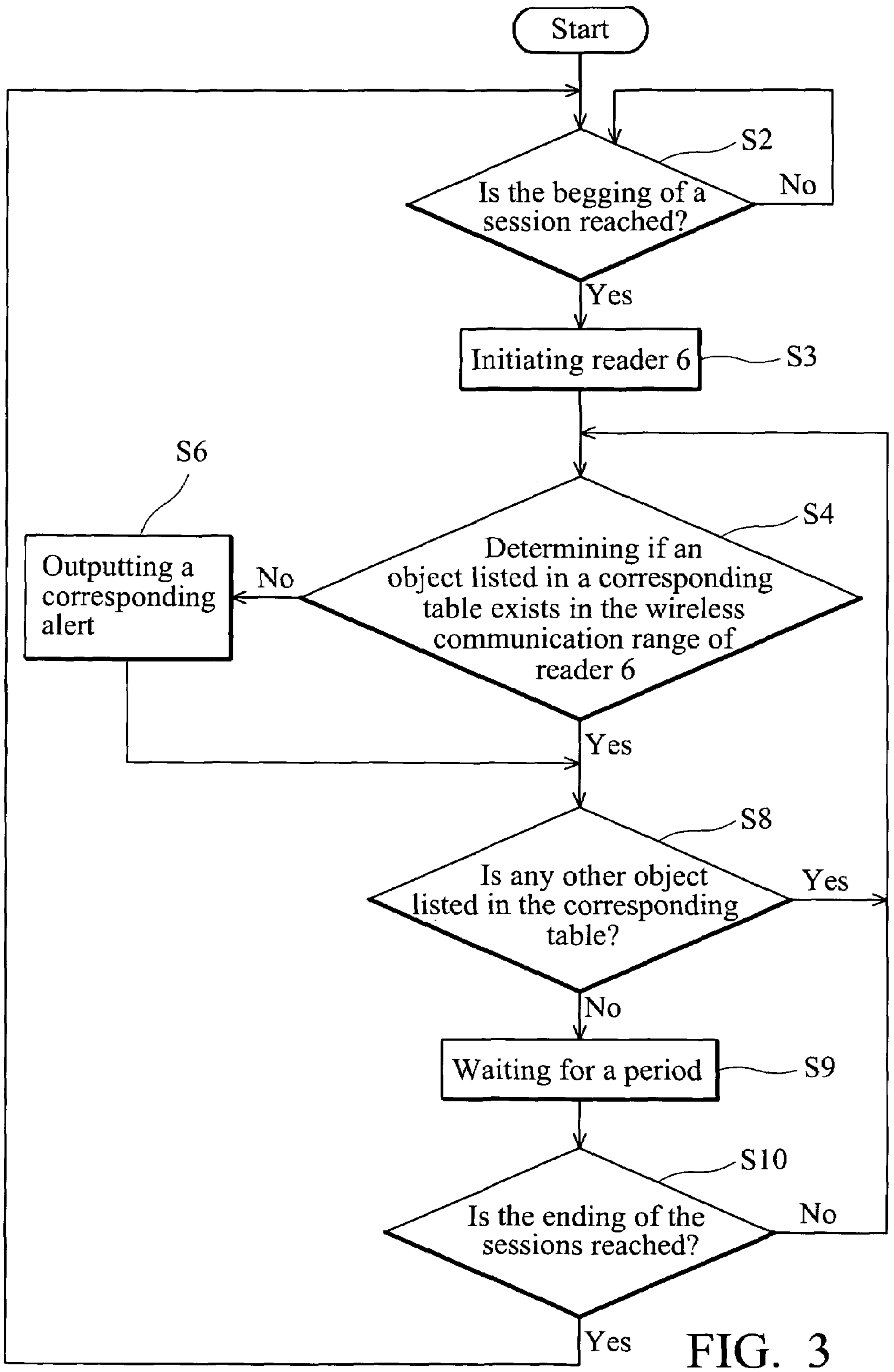
FIG. 3 is a flowchart showing the operations of the RFID system.
Figure 5:
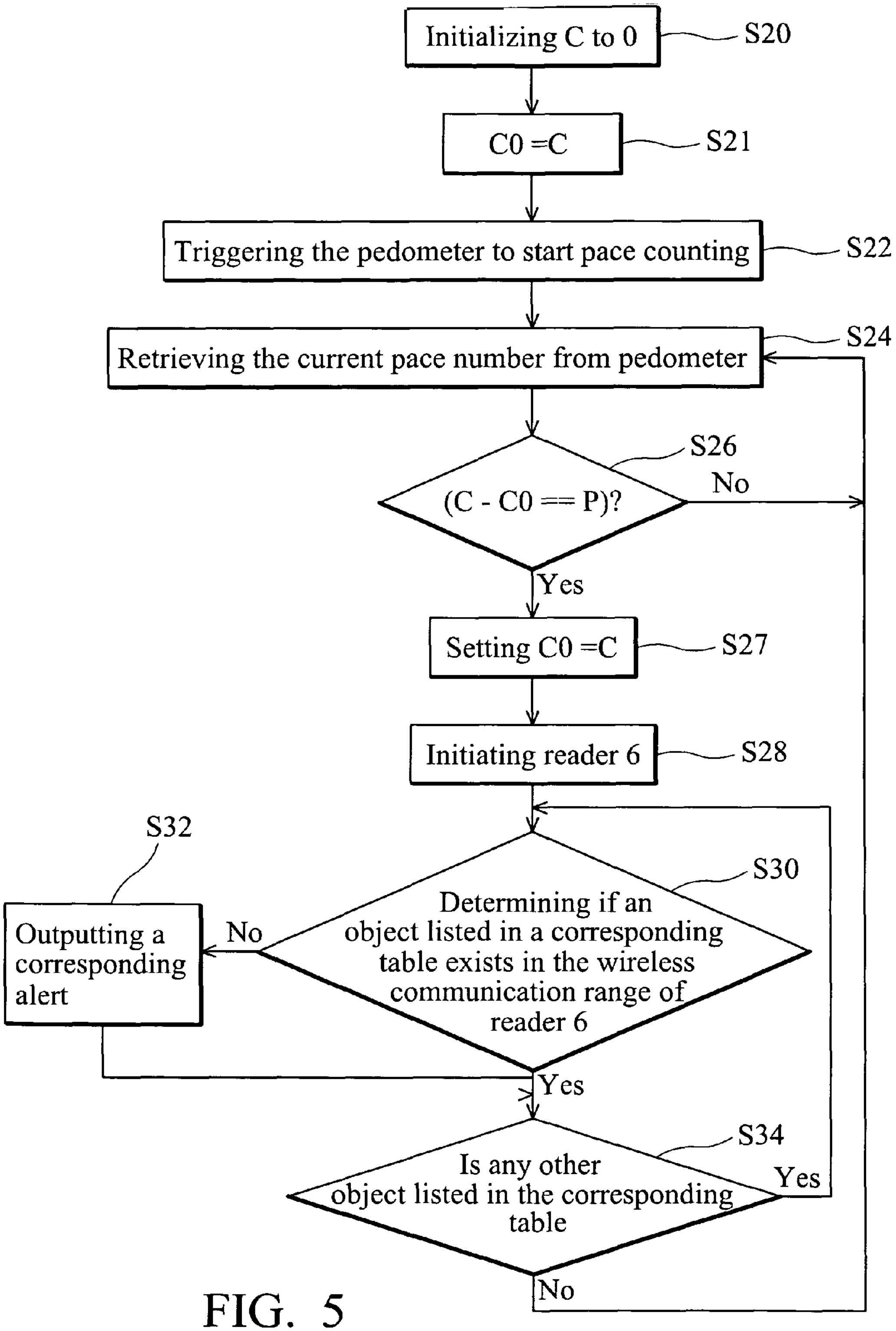
FIG. 5 is a flowchart showing the operations of the RFID system of FIG. 4.

The RFID methods of FIGS. 3 and 5 may be selectively or simultaneously performed. An RFID system may provide a graphical user interface (GUI) options for configuring settings.

With reference to FIG. 3, processor 1 may determine if the beginning of a session (such as session 201) is reached with reference to timer 11 or a clock (not shown) (step S2). If not, step S2 is repeated. If so, processor 1 initiates reader 6 (step S3), retrieves a table to which the session corresponds, and determines if an object listed in the table (such as table 211) exists in the wireless communication range of reader 6 (step S4). By comparing the tag ID listed in the corresponding table with the tag ID retrieved by reader 6, it is determined whether the tag attached to the object exists in the wireless communication range.

When more than one tag exist in the wireless communication range, reader 6 can read the tag ID of one tag in a time slot utilizing a multiple access scheme. After reader 6 reads and transmits a tag ID to processor 1, processor 1 determines if the received tag ID is identical to the tag ID of the object. If so, processor 1 determines that the object exists in the wireless communication range of reader 6.

If the object does not exist in the wireless communication range of reader 6, processor 1 outputs a corresponding alert (step S6), for example, by providing audio signals through a speaker (not shown), displaying a text or image message on display 5, or vibrating case 101 utilizing a vibrator. Messages shown on display 5 may indicate names, tag IDs, or symbols of objects absent from the wireless communication range.

Processor 1 determines if another object is listed in the corresponding table (step S8). If so, step S4 is repeated. If not, processor 1 waits for timer 11 to expire after a period (step S9), determines if the end of the session is reached (step S10). If so, step S2 is repeated. If not, step S4 is repeated. The waiting time can be included in the time setting and is adjustable.

Figure 4:
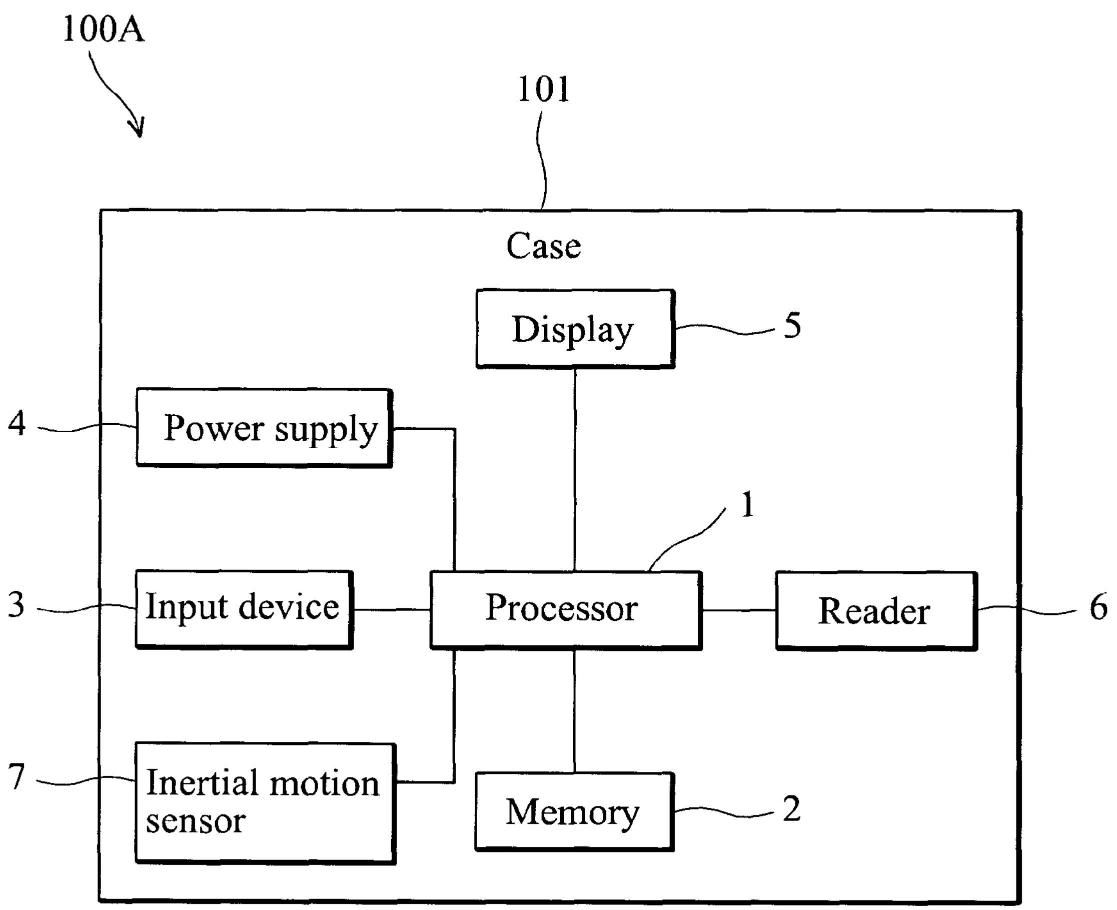
FIG. 4 is a block diagram of another exemplary embodiment of an RFID system.

With reference to FIG. 4, RFID system 100A further comprises inertial motion sensor 7 detecting motion of the RFID system. When identifying movement of RFID system 100A, inertial motion sensor 7 triggers reader 6, and processor 1 begins to determine if the tags recorded in memory 2 exist in the wireless communication range of reader 6. The tags may be recorded in memory 2 in the form as tables 211-213. RFID system 100A may be worn by a user.

For example, the inertial motion sensor comprises a pedometer. When the number counted by the pedometer increases with the steps of a user to a predetermined value, the sensor triggers reader 6 and the tag ID determination. Alternatively, when the time setting indicates a fixed pace number P, processor 1 may identify for tags listed in a table (such one of tables 211-213) each time when the number counted by the pedometer is increased by a number P.

With reference to FIG. 5, the pace number of the pedometer is initialized to 0 (step S20), processor 1 set a variable C0=C as a reference pace number (step S21). Processor 1 triggers the pedometer to start pace counting (step S22), retrieves the pace number counted by the pedometer (step S24), and determines if C−C0=P (step S26). If not, step S24 is repeated. If so, processor 1 set variable C0=C (step S27), initiates reader 6 (step S28), and determines if an object listed in the specific table (such as table 211) stored in memory 2 exists in the wireless communication range of reader 6 (step S30). When a plurality of tags exist in the wireless communication range of reader 6, reader 6 can read the tag ID of one tag in a time slot utilizing a multiple access scheme. After reader 6 reads and transmits a tag ID to processor 1, processor 1 determines if the received tag ID is identical to the tag ID of the object. If so, processor 1 determines that the object exists in the wireless communication range of reader 6. Step S34 is then executed. If the object does not exist in the wireless communication range of reader 6, processor 1 outputs a corresponding alert (step S32). In step S34, processor 1 determines if another object is listed in the corresponding table (step S34). If so, step S30 is repeated. If not, step S24 is repeated.

The reader initiation process incorporated with the pedometer or the timer may be simultaneously implemented in a session for identifying tag IDs. RFID systems 100 and 100A may be integrated in one device.

The RFID system may be integrated in a portable device for detecting the absence of necessities for different sessions, wherein the timing and frequency to trigger detection may be adjusted with respect to the time setting, and the wireless communication range can also be adjusted.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A radio frequency identification (RFID) system, comprising:

a reader, when initiated, receiving an identification code of a first tag within a wireless communication range;

a memory storing a time setting and an identification code of a second tag, wherein the time setting indicates a plurality of sessions in a schedule, each session corresponds to identification codes of a plurality tags respectively attached to a plurality of objects; and a processor initiating the reader at a predetermined time indicated by the time setting, thus determining whether the second tag exists in the wireless communication range.

2. The system as claimed in claim 1, wherein the time setting indicates a cycle, wherein the processor periodically initiates the reader to determine once for each cycle whether the second tag exists in the wireless communication range.

3. The system as claimed in claim 1, further comprising: a clock, wherein when the clock reaches the beginning of a session, the processor initiates the reader to determine whether the tags attached to the objects exist in the wireless communication range.

4. The system as claimed in claim 1, further comprising:

a power supply supplying electrical power to the RFID system, wherein the power supply, the reader, the memory, and the processor are disposed in a case to form a portable device.

5. The system as claimed in claim 4, further comprising: an input device, when operated, initiating the reader.

6. The system as claimed in claim 4, wherein the power supply comprises a solar panel or a power generator.

7. The system as claimed in claim 4, wherein the portable device comprises a personal digital assistant (PDA) or a mobile phone.

8. The system as claimed in claim 1, wherein, when the second tag does not exist in the wireless communication range, the processor directs an audio alert to be output.

9. The system as claimed in claim 1, further comprising:

a display, wherein, when the second tag does not exist in the wireless communication range, the processor displays a message on the display.

10. The system as claimed in claim 1, wherein the time setting indicates the plurality of sessions in the schedule, each session corresponds to a table, each table comprises a priority number, name, and tag identification for each of objects, and the priority number indicates the order of object detection.

11. A radio frequency identification (RFID) system, comprising:

a reader, when initiated, receiving an identification code of a first tag within a wireless communication range;

a memory storing an identification code of a second tag and a time setting, wherein the time setting indicates a plurality of sessions in a schedule, each session corresponds to a table, each table comprises a priority number, name, and tag identification for each of objects;

an inertial motion sensor detecting motion of the RFID system; and a processor initiating the reader based on the motion detection by the inertial motion sensor to determine whether the second tag exists in the wireless communication range.

12. The system as claimed in claim 11, wherein the inertial motion sensor comprises a pedometer, and when the number counted by the pedometer increases to a predetermined value, triggers the reader to be initiated.

13. The system as claimed in claim 11, further comprising:

a power supply supplying electrical power to the RFID system, wherein the power supply, the reader, the memory, and the processor are disposed in a case to form a portable device.

14. The system as claimed in claim 13, wherein the power supply comprises a solar panel or a power generator.

15. The system as claimed in claim 11, wherein, when the second tag does not exist in the wireless communication range, the processor directs an audio alert to be output.

16. The system as claimed in claim 11, further comprising:

a display, wherein, when the second tag does not exist in the wireless communication range, the processor displays a message on the display.

17. A radio frequency identification (RFID) method, implemented in an RFID system, comprising:

storing a time setting and an identification code of a first tag in the RFID system, wherein the time setting indicates a plurality of sessions in a schedule, each session corresponds to identification codes of a plurality of tags respectively attached to a plurality of objects;

initiating a reader of the RFID system on a predetermined time indicated by the time setting;

receiving an identification code of a second tag within a wireless communication range of the reader; and comparing the identification codes of the first and the second tags to determine whether the first tag exists in the wireless communication range.

18. The method as claimed in claim 17, wherein the time setting indicates a cycle, wherein the reader is periodically initiated once for each cycle to determine whether the first tag exists in the wireless communication range.

19. The method as claimed in claim 17, further comprising when a clock of the RFID system reaches the beginning of a session, initiating the reader to determine whether the tags attached to the objects exist in the wireless communication range.

20. The method as claimed in claim 17, wherein, when the first tag does not exist in the wireless communication range, outputting an audio alert.

21. The method as claimed in claim 17, wherein, when the first tag does not exist in the wireless communication range, displaying a message on a display of the RFID system.

22. The method as claimed in claim 17, wherein the time setting indicates the plurality of sessions in the schedule, each session corresponds to a table, each table comprises a priority number, name, and tag identification for each of objects, and the priority number indicates the order of object detection.

* * * * *